(12) United States Patent
Iyer et al.

(10) Patent No.: US 9,957,357 B2
(45) Date of Patent: May 1, 2018

(54) ESTER-FUNCTIONAL POLYSILOXANES AND COPOLYMERS MADE THEREFROM

(71) Applicant: Momentive Performance Materials Inc., Waterford, NY (US)

(72) Inventors: Narayana Padmanabha Iyer, Bangalore (IN); Indumathi Ramakrishnan, Bangalore (IN); Anuj Mittal, Bangalore (IN); Roy Rojas-Wahl, Teaneck, NJ (US); Samim Alam, Tarrytown, NY (US)

(73) Assignee: Momentive Performance Materials, Inc., Waterford, NY (US)

( * ) Notice: Subject to any disclaimer, the term of this patent is extended or adjusted under 35 U.S.C. 154(b) by 0 days. days.

(21) Appl. No.: 15/355,528

(22) Filed: Nov. 18, 2016

(65) Prior Publication Data
US 2017/0066885 A1 Mar. 9, 2017

Related U.S. Application Data

(62) Division of application No. 14/790,457, filed on Jul. 2, 2015, now Pat. No. 9,518,182.

(60) Provisional application No. 62/020,551, filed on Jul. 3, 2014.

(51) Int. Cl.
| | |
|---|---|
| *C08G 77/14* | (2006.01) |
| *C08G 77/38* | (2006.01) |
| *C08G 77/448* | (2006.01) |
| *C08L 69/00* | (2006.01) |
| *C08G 64/18* | (2006.01) |
| *C08G 77/12* | (2006.01) |

(52) U.S. Cl.
CPC .......... *C08G 77/14* (2013.01); *C08G 64/186* (2013.01); *C08G 77/38* (2013.01); *C08G 77/448* (2013.01); *C08L 69/00* (2013.01); *C08G 77/12* (2013.01)

(58) Field of Classification Search
None
See application file for complete search history.

(56) References Cited

U.S. PATENT DOCUMENTS

| | | | |
|---|---|---|---|
| 3,189,662 A | 6/1965 | Vaughn, Jr. | |
| 3,419,634 A | 12/1968 | Vaughn, Jr. | |
| 4,123,588 A | 10/1978 | Molari, Jr. | |
| 4,569,970 A | 2/1986 | Paul et al. | |
| 4,732,949 A | 3/1988 | Paul et al. | |
| 4,879,378 A | 11/1989 | Foster et al. | |
| 4,895,965 A | 1/1990 | Langer | |
| 4,920,183 A | 4/1990 | Evans et al. | |
| 4,994,532 A | 2/1991 | Hawkins et al. | |
| 5,068,302 A | 11/1991 | Horlacher et al. | |
| 5,229,408 A | 7/1993 | Bruneau | |
| 5,292,850 A | 3/1994 | Pallini et al. | |
| 5,504,177 A | 4/1996 | King, Jr. et al. | |
| 5,726,271 A | 3/1998 | Furukawa et al. | |
| 6,133,394 A | 10/2000 | Furukawa et al. | |
| 6,136,521 A | 10/2000 | Hikosaka et al. | |
| 6,172,252 B1 | 1/2001 | Amako et al. | |
| 6,258,968 B1 | 7/2001 | Eversheim et al. | |
| 8,053,534 B2 | 11/2011 | Lee et al. | |
| 8,426,532 B2 | 4/2013 | Huang et al. | |
| 9,518,182 B2 * | 12/2016 | Iyer ........................ | C08L 69/00 |
| 2002/0112293 A1 * | 8/2002 | Trinh ..................... | C11D 3/222 |
| | | | 8/115 |
| 2004/0220330 A1 | 11/2004 | DeRudder et al. | |
| 2008/0242804 A1 | 10/2008 | Dhara et al. | |
| 2011/0178112 A1 | 7/2011 | Kristiansen et al. | |
| 2015/0315380 A1 | 11/2015 | Bahn et al. | |

FOREIGN PATENT DOCUMENTS

WO     2015002427 A1    1/2015

OTHER PUBLICATIONS

Webpage from the website entitled commonorganic chemistry.com having the url http://www.commonorganicchemistry.com/Rxn_Pages/THP_Protection/THP_Protection_HCl_Dep_Mech.htm.*
Abstract for "Effect of Hydrochloric Acid on the Hydrolytic Copolycondensation of Dimethyldichlorosilane with trimethylchlorosilane" Vysokomolekulyarnye Soedineniya, Seriya A (1986) 28(7), 1465-1472.*
International Search Report and Written Opinion for PCT/US2015038954, dated Sep. 23, 2015, 9 pages.

* cited by examiner

*Primary Examiner* — Marc S Zimmer
(74) *Attorney, Agent, or Firm* — Hoffman Warnick LLC

(57) ABSTRACT

There is described a polysiloxane having the structure:

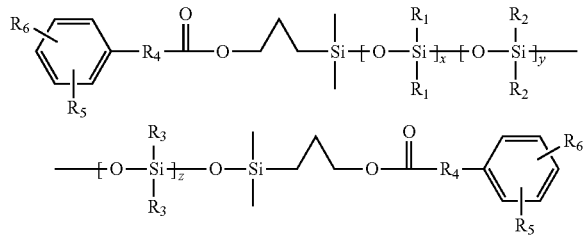

wherein $R_1$, $R_2$, and $R_3$ are independently a hydrocarbon radical, an unsaturated radical, an alkoxy radical, an aryl radical or an alkenyloxy radical, $R_4$ is independently a direct bond or hydrocarbon radical optionally substituted with oxygen and nitrogen, $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, $R_6$ is independently a hydroxyl group, an amine group, an acid chloride group, or a sulfonyl halide group, x is from 1 to 300; y is from 0 to 50; and z is from 0 to 50. The polysiloxane is used to make various copolymers and polymer blends. A variety of articles can be made using the polysiloxane described as a polymer blend or copolymer.

6 Claims, No Drawings

ESTER-FUNCTIONAL POLYSILOXANES AND COPOLYMERS MADE THEREFROM

CROSS-REFERENCE TO RELATED APPLICATIONS

This application is a divisional of co-pending U.S. patent application Ser. No. 14/790,457 filed on Jul. 2, 2015.

BACKGROUND

Field of the Invention

The invention is directed to ester-functional polysiloxanes and copolymers made therefrom.

Background of the Invention

Polycarbonate resins are well-known thermoplastic resins which have long been used in a variety of applications requiring resistance to impact. At low temperatures, generally lower than 20° C., polycarbonate becomes brittle and its utility is thus limited by this shortcoming. It is known that the low temperature impact strength of polycarbonate may be improved upon by the introduction (by copolymerization) of silicone blocks into the carbonate structure. U.S. Pat. Nos. 3,189,662; 3,419,634; 4,123,588; 4,569,970; 4,920,183 and 5,068,302 are noted to disclose relevant copolymers.

Relevant copolymers have been prepared in accordance with a melt blending process disclosed in U.S. Pat. No. 4,994,532. The process entails melt blending an aromatic polycarbonate resin and a polydiorganosiloxane having at least one functional carboxylic acid group.

Also relevant in the present context is U.S. Pat. No. 3,189,662 which disclosed a preparation method of polycarbonate siloxane co-monomer wherein the bisphenol moieties are bound to both the ends of polydimethylsiloxane. However hydrolysis of the siloxane monomer is likely to occur after polymerization due the presence of unstable silicone-oxygen bonds connecting Si atom and reactive moieties. The presence of hydrolytically unstable Si—O—C bonds leads to poor weather resistance and poor mechanical properties of the copolymer. While the foregoing silicone copolymers readily enter into a modification reaction because their hydroxyl groups are located at the para-position of the phenyl group, the polycarbonate resins produced are unstable and subject to hydrolysis because of the presence of Si—O—C linkage in the polymer chain. Such problems have been solved by developing siloxane monomers comprising of Si—C bonds which provides improved hydrolysis resistance. Monomers with improved heat stability and hydrolysis resistance having silicon alkyl bonds have been developed.

Three general paths to linear hydroxyaryloxy-terminated siloxanes of the following general structure are known in the prior art:

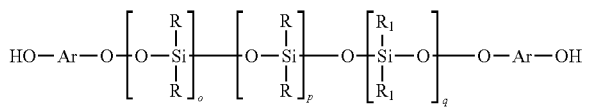

(A) U.S. Pat. No. 3,189,662 describes the reaction of chloroterminated polysiloxanes with bisphenolic compounds eliminating hydrochloric acid as the byproduct; (B) U.S. Pat. No. 4,732,949 describes the reaction of bisphenolic compounds with α,ω-bisacyloxypolydiorganosiloxanes in a solvent, and (C) U.S. Pat. No. 6,258,968 describes the reaction of bisphenolic compounds such as hydroquinone with a cyclic dialkyl siloxane such as octamethylcyclotetrasiloxane in a solvent, whereby an acid catalyst is used and water is removed from the reaction mixture by distillation.

As an alternative to hydroxyaryloxy-terminated siloxanes, carbonate-terminated siloxanes have also been used to prepare polysiloxane-polycarbonate block copolymers. For example, U.S. Pat. No. 5,504,177 describes a solvent-free melt process for preparing polydiorganosiloxane-polycarbonate block copolymers using Si—O—C free carbonate-terminated siloxanes of the general formula:

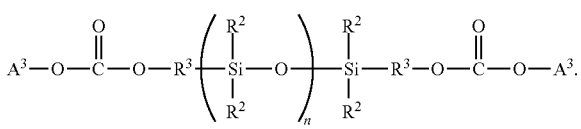

However, this path has the disadvantage that it requires the use of expensive p-allylphenolic precursors for the group $R^3$ and the use of platinum catalysts, which adds to the cost of the process.

U.S. Pat. No. 4,895,965 describes a method for making carboxy aryl terminated organosiloxanes such as 1,1,3,3-tetramethyl-1,3-disiloxane diallylbis(benzoic acid) of general formula:

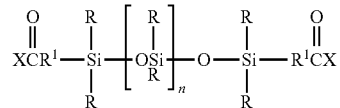

which is used for making polycarbonate-polysiloxane and polyester-siloxane copolymers.

U.S. Pat. No. 4,879,378 discloses polysiloxane containing sterically hindered phenol moieties, represented by general formula $MD_xD'_yM$, wherein

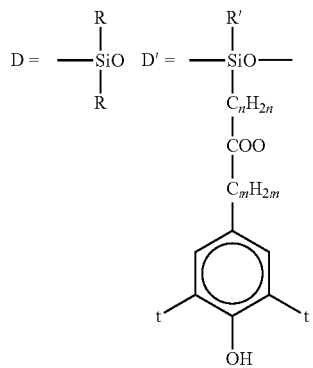

The sterically hindered phenol group attached to silicone atom via carbonyloxy containing linkage. This type of materials is used as stabilizers for polymers.

U.S. Pat. No. 5,292,850 discloses polymeric stabilizers with polysiloxane structure contain sterically hindered phenol groups and reactive groups capable of binding themselves to the polymer structure to be stabilized. These polymeric stabilizers are particularly suitable for applications which require the no extractability of additives due to solvents facts or soaps.

U.S. Pat. No. 8,426,532 describes the method of forming polycarbonate graft copolymers. Polycarbonate polymer or copolymer containing allyl groups provides the backbone for the graft copolymer, and pendant chains are attached to the copolymer through allyl groups.

However, polycarbonate-polysiloxanes disclosed in the prior art have the disadvantage that the precursor ester-functional polyorganosiloxanes possess non-suitable reactive terminal groups for interfacial polymerization. Additionally, the prior art manufacture of ester-functional polysiloxane requires the use of expensive precursors.

Accordingly, there is a need for cost effective novel polysiloxane copolymer compositions and polysiloxane polymer blends having an ester-functional polysiloxane precursor with suitable terminal reactive group for interfacial copolymerization. There is a need for ester functional hydroxyl aryl terminated siloxane compositions with improved thermal and hydrolytic stability. The present invention provides a cost effective method for producing ester-functional polysiloxanes. These ester-functional polysiloxanes when used in copolymers or polymer blends enhance low temperature impact resistance, flame resistance, hydrolytic and heat aging properties of the copolymers or polymer blends.

SUMMARY

Disclosed herein is a polysiloxane having the structure of Formula I:

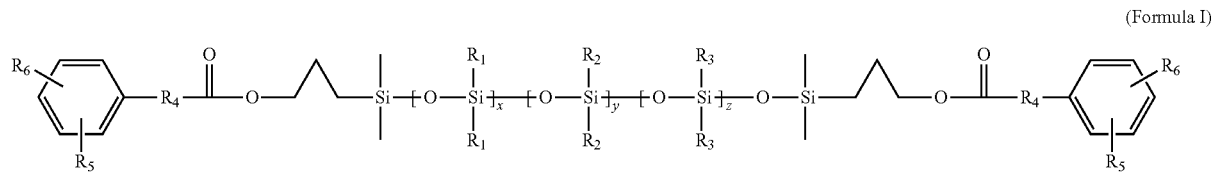

(Formula I)

wherein $R_1$, $R_2$, and $R_3$ are independently a hydrocarbon radical, an unsaturated radical, an alkoxy radical, an aryl radical or an alkenyloxy radical. $R_4$ is independently a direct bond or hydrocarbon radical optionally substituted with oxygen and nitrogen, $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, $R_6$ is independently a hydroxyl group, an amine group, an acid chloride group, or a sulfonyl halide group. x is from 1 to 300; y is from 0 to 50 and z is from 0 to 50.

There is provided a copolymer composition having at least one polyorganosiloxane having units of Formula II:

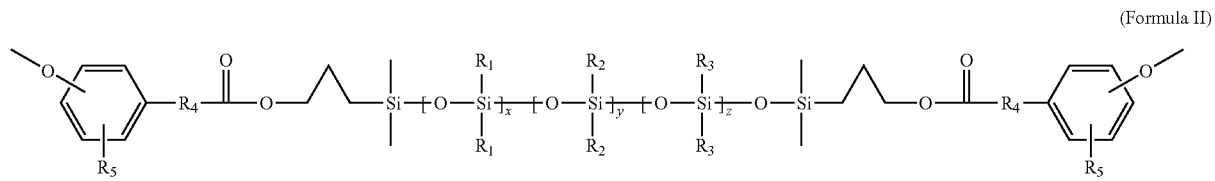

(Formula II)

wherein $R_1$, $R_2$, and $R_3$ are independently a hydrocarbon radical, an unsaturated radical, an alkoxy radical, an aryl radical or an alkenyloxy radical; $R_4$ is independently a direct bond or dirhydrocarbon radical optionally substituted with oxygen and nitrogen; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; wherein x ranges from 1 to 300; y ranges from 0 to 50; and z ranges from 0 to 50.

Disclosed herein is a method of preparing a polysiloxane copolymer, including polymerizing a polyorganosiloxane of Formula I represented by:

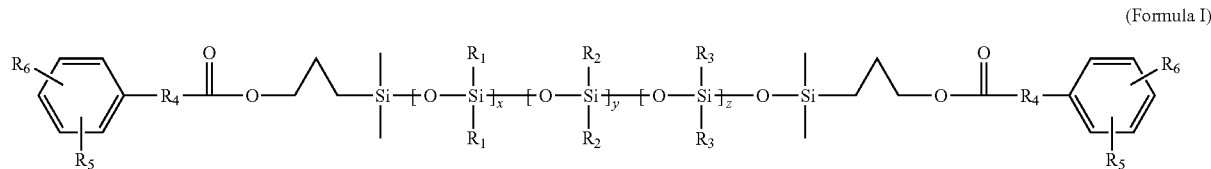

(Formula I)

wherein $R_1$, $R_2$, and $R_3$ are independently a hydrocarbon radical, an unsaturated radical, an alkoxy radical, an aryl radical or an alkenyloxy radical; $R_4$ is independently a direct bond or hydrocarbon radical optionally substituted with oxygen and nitrogen; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_6$ is independently a hydroxyl group, an amine group, an acid chloride group, or a sulfonyl halide group; wherein x ranges from 1 to 300; y ranges from 0 to 50; z ranges from 0 to 50 with a compound represented by:

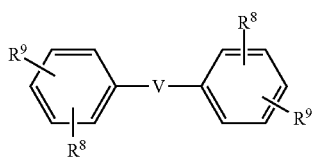

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is

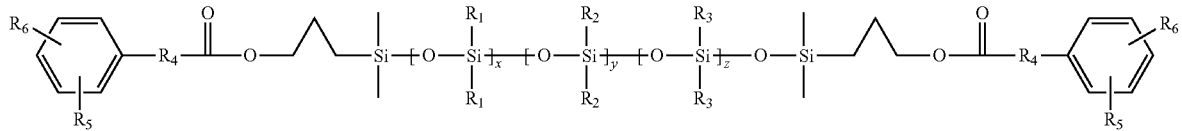

independently a hydroxyl group, an amine group, an acid chloride group, or a sulfonyl halide group; and V is selected from the group consisting of:

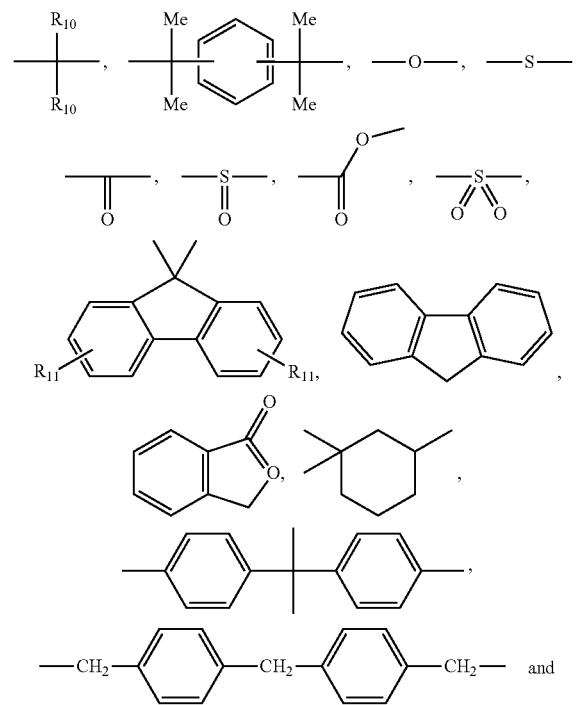

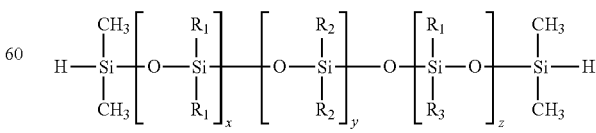

-continued wherein $R_{10}$, $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group in the presence of a carbonate precursor, to provide the polysiloxane copolymer.

DETAILED DESCRIPTION

Disclosed herein is an ester-functional polysiloxane, polysiloxane-copolymers and polysiloxane polymer blends prepared thereof. These copolymers and polymer blends exhibit advantageous properties such as improved low temperature properties, improved rheological properties during molding, improved chemical and scratch resistance, improved electrical insulation, improved heat aging and hydrolytic resistance properties.

In an embodiment, the invention herein is directed to a polysiloxane having the structure below:

wherein $R_1$, $R_2$, and $R_3$ are independently a hydrocarbon radical, an unsaturated radical, an alkoxy radical, an aryl radical or an alkenyloxy radical, $R_4$ is independently a direct bond or hydrocarbon radical optionally substituted with oxygen and nitrogen, $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, $R_6$ is independently a hydroxyl group, an amine group, an acid chloride group, or a sulfonyl halide group, x is from 1 to 300; y is from 0 to 50 and z is from 0 to 50. The disclosure is also directed to polymer blends including the polysiloxane described above.

There is described a method of preparing a polysiloxane compound of the structure shown above. The method includes obtaining a hydride terminated siloxane from cyclic oligomers, e.g. a cyclic siloxane. The hydride terminated siloxanes can be obtained through ring opening polymerization of a cyclic siloxane with disiloxane hydride in presence of acidic and/or basic catalyst. The hydride terminated siloxane represented by the formula:

wherein $R_1$, $R_2$ and $R_3$ are independently a hydrocarbon radical, unsaturated radical, an alkoxy radical, an aryl radical or an alkenyloxy radical; wherein x is from 1 to 300;

y is from 0 to 50; and z is from 0 to 50, is reacted with allyl-4-((tetrahydro-2H-pyran-2-yl)oxy)benzoate or allyl 2-(4-((tetrahydro-2H-pyran-2-yl)oxy)phenyl)acetate or similar compounds and their derivatives at an effective temperature of about 80 to 200° C., preferably 100 to 150° C. and more preferably 80 to 100° C. to form a phenol-protected siloxane. The allyl-4-((tetrahydro-2H-pyran-2-yl)oxy)benzoate or allyl 2-(4-((tetrahydro-2H-pyran-2-yl)oxy)phenyl)acetate and similar compounds and their derivatives are "phenol-protected." Tetrahydropyranyl (THP) ether is the group used for protection of the phenol. Phenol protection is obtained for allyl-4-hydroxy benzoate, allyl-4-hydroxy phenyl acetate or similar compounds and their derivatives using tetrahydropyranyl (THP) ether in the presence of strong bases, Grignard reagents, hydrides, redox reagents, alkylating and acylating agents, and hydrogenation catalysts. Allyl-4-((tetrahydro-2H-pyran-2-yl)oxy)benzoate or allyl 2-(4-((tetrahydro-2H-pyran-2-yl)oxy)phenyl)acetate and similar compounds and their derivatives are tetrahydropyranylated and therefore "phenol-protected." The phenol-protected siloxane compound is "deprotected" by using the mixture of polar solvents and a mineral acid, for example, THF/HCl to obtain phenol-deprotected siloxane. Various other methods of phenol protection and de-protection which are presently unforeseen or unanticipated alternatives, modifications, variations, or improvements therein may be subsequently made by those skilled in the art which are also encompassed by the claims of this invention. The deprotected siloxane is purified to remove organics. The purification is conducted at a reduced pressure at a temperature of about 150 to 300° C. to obtain the pure polysiloxane compound.

The invention is also directed to a copolymer composition having units including an ester-functional polysiloxane referred to as Formula I:

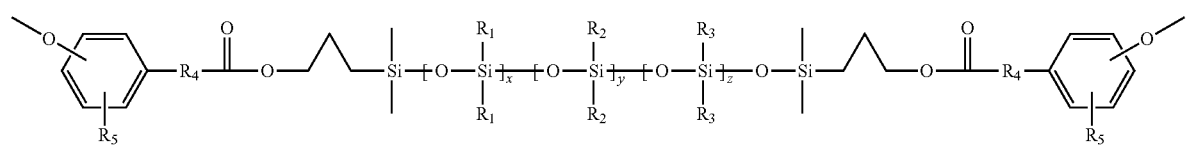

wherein $R_1$, $R_2$, and $R_3$ are independently a hydrocarbon radical, an unsaturated radical, an alkoxy radical, an aryl radical or an alkenyloxy radical; $R_4$ is independently a direct bond or hydrocarbon radical optionally substituted with oxygen and nitrogen; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; wherein x ranges from 1 to 300; y ranges from 0 to 50; and z ranges from 0 to 50.

In embodiments, Formula I is combined with a polycarbonate homopolymer, a polycarbonate copolymer, a polycarbonate-polyester, a polyester, a polysulfone, a polyethersulfone, a polyetheretherketone, a polyimide, a polyetherimide or combinations thereof to form a copolymer composition or polymer blend.

In embodiments, the invention is also directed to a composition, including polysiloxane of Formula I or a copolymer including the units of Formula II and Formula III below.

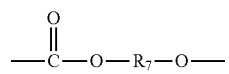

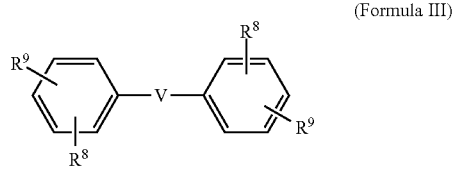

wherein each $R_7$ is a hydrocarbon radical having 1 to 60 carbon atoms, a divalent hydrocarbon group, or a group derived from the structural unit;

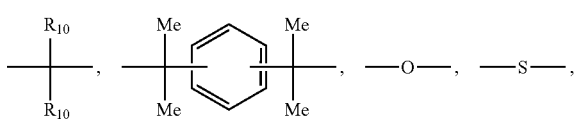

where $R_8$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; and $R_9$ is independently a hydroxyl group, an amine group, an acid chloride group, or a sulfonyl halide group; and V is selected from the group consisting of:

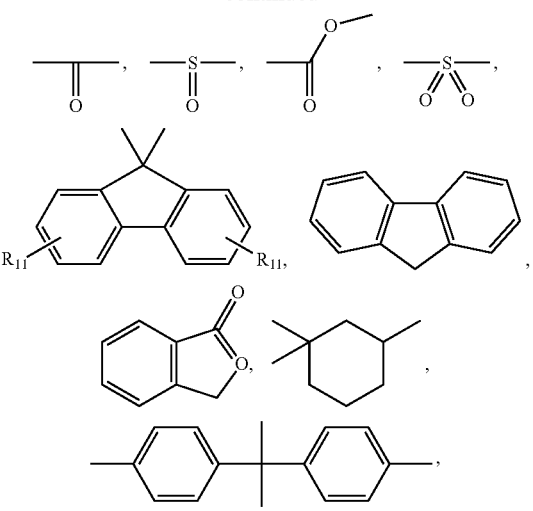

-continued

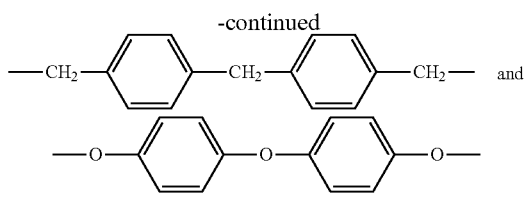

wherein $R_{10}$ and $R_{11}$ are independently a hydrogen, halogen, an alkyl group having from 1 to 18 carbon atoms, an aryl group having from 3 to 14 carbon atoms, an aryloxy group having from 6 to 10 carbon atoms, an aralkyl group having from 7 to 20 carbon atoms, an alkoxy group having from 1 to 10 carbon atoms, a cycloalkyl group having from 6 to 20 carbon atoms, a cycloalkoxy group having from 6 to 20 carbon atoms, an alkenyl group having from 2 to 10 carbon atoms, an aralkyloxy group, a nitro group, an aldehyde group, a cyano group, or a carboxyl group.

In embodiments of the copolymer disclosed above $R_9$ is a hydroxy group and $R_{10}$ is alkyl group of from 1 to 6 carbon atoms.

The copolymer of the present invention may be prepared by polymerizing a dihydroxy benzene compound with a bis-functionalized polyorganosiloxane compound in the presence of a carbonate precursor, such as phosgene. In one embodiment, the dihydroxy benzene compound is bisphenol A, and the bis-functionalized polydiorganosiloxane compound of Formula I.

In embodiments of the method of polymerizing the copolymer disclosed herein, the carbonate precursor is selected from the group consisting of phosgene, diphosgene and diarylcarbonates, bis(methylsalicyl)carbonate, or combinations thereof.

In embodiments, the polymerization reaction is an interfacial polymerization process conducted in the presence of a solvent and optionally one or more catalysts.

In embodiments, the polymerization reaction is an interfacial polymerization process conducted in the presence of a solvent that includes chlorinated aliphatic organic liquid, methylene chloride, chloroform, carbon tetrachloride, 1,2-dichloroethane, trichloroethane, tetrachloroethane, dichloropropane, 1,2-dichloroethylene, chlorobenzene, dichlorobenzene, chlorine-containing aromatic solvents, toluene, various chlorotoluenes and the like, aqueous solvents such as de-ionized water and optionally one or more catalysts.

In embodiments, the polymerization reaction is an interfacial polymerization process conducted in the presence of a solvent, a caustic, and optionally one or more catalysts. When the carbonate precursor is phosgene, diphosgene and diarylcarbonates, bis(methylsalicyl)carbonate, or a combination thereof, suitable catalysts for the interfacial polymerization reaction includes aliphatic amines such as tertiary amine catalysts, trialkylamine; phase transfer catalyst such as catalysts of the formula $(A_3)4L+B$, wherein each A is independently a C1-10 alkyl group; L is a nitrogen or phosphorus atom; and B is a halogen atom or a C1-8 alkoxy group or C6-18 aryloxy group. Combinations of such catalysts are also effective.

A variety of articles of manufacture can be made using the copolymers of the invention, and particularly using polymer blend compositions containing the copolymers of the invention (for example, in combination with a polycarbonate homopolymer). For example, such articles include but are not limited to mobile phone housings, frozen food service equipment, personal safety applications including helmets, automotive and motorcycle windshields, automotive sunroofs, other automotive applications including dashboards allowing for robust airbag deployment without fragmenting, and automotive headlamp or electronics screen applications, where clarity, flame retardance, and impact resistance are beneficial.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Synthesis of Hydride Terminated Siloxane Fluid $^{H}MD_{45}M^{H}$

A mixture of octamethylcyclotetrasiloxane (D4) (500 g), and Purolite CT275 (2.298 g) were placed in a 500 ml RB flask equipped with a magnetic stirrer, a reflux condenser and stirred under nitrogen. To the stirred mixture, 1,1,3,3-tetramethyldisioloxane (HMMH)(19.68 g) was added at room temperature. The flask heated and held at about 50° C. for about one hour and then the temperature was increased to about 60° C. for about one hour. The temperature was then increased to 70° C. for about 2 hours and then increased to about 80° C. for about 4 hours. After completion of the reaction, the flask was cooled to less than 30° C., treated with Celite (0.750 g) and filtered. Volatiles were removed by applying a vacuum at 130° C./5 mbar to yield 480 g of clear colorless liquid. The liquid had the following characteristics: Solid content was 98%, Viscosity was 15-20 mPas, Hydride content was 11.68 cc $H_2$/g (0.0521 wt %), the Molecular weight Mn was 4648, and the polydispersity index (PDI) was 1.6.

Example 2

Synthesis of Phenol (Allyl-4-Hydroxy-Benzoate) Terminated Siloxane Fluid $^{AHB}MD_{45}M^{AHB}$ A 250 ml RB flask was charged with $^{H}MD_{45}M^{H}$ (75 g, as prepared above) and alumina supported platinum catalyst (0.350 g) was stirred under notrogen and brought to 80° C. Allyl-4-((tetrahydro-2H-pyran-2-yl)oxy)benzoate (3,4-dihydro-2H-pyran protected phenol) (9.622 g) was charged into an addition funnel and added drop wise to maintain a reaction temperature less than about 100° C. Following the addition, the reaction mixture was brought to about 80° C. for 1 hour and then the temperature was increase to about 100° C. for about 2 hours. Completion of the hydrosilylation reaction was confirmed by proton NMR. The reaction mixture was allowed to cool to less than 30° C., treated with Celite (0.5 g) and filtered. Deprotection of phenol is done using THF/HCl mixture at 30° C. The resulting fluid was then stripped at 200° C./5 mbar to yield clear pale yellow liquid. The liquid had the following characteristics: Solid content was 98%, Viscosity was 130-150 mPas, the Molecular weight Mn was 4653, and the PDI was 1.8.

Example 3

Synthesis of Phenol (Allyl-4-Hydroxyphenyl Acetate) Terminated Siloxane Fluid $^{AHPA}MD_{45}M^{AHPA}$ Using the same reaction conditions in Example 1, allyl 2-(4-((tetrahydro-2H-pyran-2-yl)oxy)phenyl)acetate ((3,4- dihydro-2H-pyran protected phenol allyl-4-hydroxyphenyl acetate) was used in the place of Allyl-4-((tetrahydro-2H-pyran-2-yl)oxy)benzoate (3,4-dihydro-2H-pyran protected phenol). The liquid had the following characteristics: Solid content was 98%, Viscosity was 127-140 mPas, the Molecular weight Mn was 4703, and the PDI was 1.7.

Example 4

Synthesis of Phenyl Containing Siloxane Fluid $^{H}MD_{61.87}D^{Ph}_{25.99}M^{H}$ A 1 L 3-necked round flask equipped with a mechanical stirrer, a thermometer and a vacuum distillation was charged 352 g of silanol terminated methyl phenyl siloxane fluid (YF3804), 149 g of hydrogen terminated methyl siloxane fluid (M'D$_{18}$M') and 81.5 g of octamethylcyclotetrasiloxane. The mixture was heated to 90° C. and then added linear phosphonitrilic chloride (LPNC) catalyst for condensation and rearrangement reactions. The mixture was vacuumed to 90 mmHg and held at about 90° C. for 20 hours. The reaction mixture was then added 15.3 g of sodium hydrogen carbonate to neutralize the LPNC catalyst. The mixture was cooled to less than about 40° C. and filtered with Celite. The refractive index of each sample was measured. The solid content was 98 percent.

Example 5

Synthesis of Phenol (Allyl-4-Hydroxy-Benzoate) Terminated Siloxane Fluid $^{AHB}MD_{61.87}D^{Ph}_{25.99}M^{AHB}$ A 250 ml RB flask was charged with $^{H}MD_{61.87}D^{Ph}_{25.99}M^{H}$ (50 g, as prepared above) and alumina supported platinum catalyst (0.290 g) stirred under nitrogen and brought to about 80° C. Allyl-4-((tetrahydro-2H-pyran-2-yl)oxy)benzoate (3,4-dihydro-2H-pyran protected phenol) (2.7 g) was charged into an addition funnel and added drop wise at a rate to maintain a reaction temperature to less than about 100° C. Following the addition the reaction mixture was brought to about 80° C. for 1 hour and then the temperature was increased to about 100° C. for 2 hours. Completion of the hydrosilylation reaction was confirmed by proton NMR. The reaction mixture was allowed to cool to less than 30° C., treated with Celite (0.5 g) and filtered. Deprotection of phenol is done using THF/HCl mixture at 30° C. The resulting fluid was then stripped at 200° C./5 mbar to yield clear pale yellow liquid. The liquid had the following characteristics: Solid content was 98%, Viscosity was 350-360 mPas, the Molecular weight Mn was 4114, and the PDI was 2.2.

Example 6

Synthesis of Phenol (Allyl-4-Hydroxy-Benzoate) Terminated Siloxae Fluid $^{AHB}MD_xD^{vinyl}M^{AHB}$ A 250 ml RB flask was charged with $^{AHB}MD_{10}M^{AHB}$ (20 g, as prepared above), 2,4,6,8-tetramethyl-2,4,6,8-tetravinylcyclotetrasiloxane (4.45 g) (D4 vinyl) and concentrated sulfuric acid catalyst (0.022 mg). The reaction mixture was brought to about 80° C. and stirred under nitrogen for 16 hours. After completion of the reaction the reaction mixture was neutralized by adding solid sodium carbonate and filtered through Celite. The resulting fluid was then stripped at 190° C./5 mbar to yield clear pale yellow liquid. The liquid had a solid content of 98%.

Comparative Example 1

Synthesis of Phenol (Eugenol) Terminated Siloxane Fluid $^{Eu}MD_{45}M^{Eu}$

A 250 ml RB flask was charged with $^{H}MD_{45}M^{H}$ (50 g, as prepared above) and alumina supported platinum catalyst (0.290 g) and stirred under nitrogen and brought to 80° C. Allyl-3methoxy-4-hydroxybenzoate (Eugenol) (9.622 g) was charged into an addition funnel and added drop wise at a rate to maintain a reaction temperature at less than about 100° C. Following the addition the reaction mixture was brought to 80° C. for 1 hour and then the temperature was increased to 100° C. for 2 hours. Completion of the hydrosilylation reaction was confirmed by proton NMR. The reaction mixture was allowed to cool to less than 30° C., treated with Celite (0.5 g) and filtered. The resulting fluid was then stripped at 200° C./5 mbar to yield clear pale yellow liquid. The resulting fluid was then stripped at 200° C./5 mbar to yield clear pale yellow liquid. The liquid had the following characteristics: Solid content was 98%, Viscosity was 135 mPas, the Molecular weight Mn was 5700, and the PDI was 2.05.

Example 7

Synthesis of Polycarbonate-Polysiloxane Copolymers 10.278 g of Bisphenol-A, 1.142 g of phenol terminated siloxane fluid and 0.113 g of benezene triethylammonium chloride (BTAC) were added to the four necked RB flask containing 50 mL each of water and dichloromethane (DCM). 7.42 g of triphosgene was weighed in a glass vial under nitrogen atmosphere and was dissolved in 25 mL DCM and transferred to the addition funnel carefully. 25 mL of 25-30 wt % NaOH solution was transferred to second additional funnel fixed in the reactor. Both triphosgene and NaOH are added to the reaction mixture simultaneously with vigorous stirring (300-400 rpm). NaOH addition was carefully done in such a way that pH of the reaction mixture was maintained between 5 and 6. The stirring was continued for another 20 min. The remaining amount of NaOH was added to increase the pH to 10-11. The reaction mixture was stirred for another 5-10 minutes, 0.16 g of 4-cumyl phenol (pCP) and 54.4 mg of triethyl amine (TEA) were added. Stirring was continued for another 5-10 minutes and the pH was increased to 12 by adding aqueous NaOH. The reaction was stopped and organic layer was separated from aqueous layer using separating funnel. The polymer (organic layer) was washed with 1N HCl and precipitated in large excess of methanol. The final product was dried in an oven at about 60 to about 70° C. overnight. Similar procedures were repeated using different phenol terminated siloxane fluid in examples and comparative examples.

TABLE 1

Compositional details of PC—Polysiloxane copolymers

| Samples | $M_n$, sec | $M_w$, sec | PDI |
| --- | --- | --- | --- |
| Copolymer I: PC-Siloxane (Example-2) copolymer | 40965 | 72377 | 1.7 |

TABLE 1-continued

Compositional details of PC—Polysiloxane copolymers

| Samples | $M_n$, sec | $M_w$, sec | PDI |
|---|---|---|---|
| Copolymer II: PC-Siloxane (Example-3) copolymer | 37731 | 57731 | 1.5 |
| Copolymer III: PC-Siloxane (Example-5) copolymer | 27376 | 43612 | 1.5 |
| Copolymer IV: PC-Siloxane (Comparative example 1) copolymer | 42974 | 64852 | 1.5 |

As shown in Table 1 above, the polysiloxane-polycarbonate copolymers prepared by using ester-functional polysiloxane of Examples 2, 3 and 5 showed generally comparable number average molecular weight (Mn), weight average molecular weight (Mw) and polydispersity index (PDI) as compared with those of the polysiloxane-polycarbonate copolymers prepared according to the Comparative Example 1 (Eugenol terminated polysiloxane-polycarbonate copolymer). This clearly indicates the polymerizability of ester-functional polysiloxane and functionalized ester-functional polysiloxane with bisphenol-A in presence of triphosgene is quite similar to standard eugenol terminal polysiloxane. In addition, the cost effective ester-functional polysiloxane materials would copolymerized with other monomers to form the corresponding copolymers with distinguishable properties improvement.

Preparation of Polycarbonate and Polycarbonate-Polysiloxane blends: Up to 5 wt % of the polycarbonate-polysiloxane copolymers (Copolymers I to IV) made are melt-blended in Haake batch mixer with approximately 95 wt % of polycarbonate at 305° C. for 7 min. Compositional details are shown in below Table 2. The molten strands were collected and used sample preparation for flammability tests.

TABLE 2

| Blends | Polycarbonate-Polysiloxane copolymer in the blend | Polycarbonate-polysiloxane copolymer content (wt %) in the blend |
|---|---|---|
| Blend-1 | Copolymer I | 5 |
| Blend-2 | Copolymer II | 5 |
| Blend-3 | Copolymer III | 5 |
| Polycarbonate Homopolymer | — | — |

In another embodiment, the thermoplastic composition includes about 40 to about 80 wt. % of the polycarbonate resin; more than 5 wt. % of the polycarbonate-polysiloxane copolymer, Optionally, the composition may comprise about 2 to about 15 wt. % of the impact modifier, 2 to 15 wt. % of an organic phosphorus containing flame retarding agent, e.g., about 8 to 15 wt. %, based on the total combined weight of the composition, excluding any filler. These amounts provide optimal flame retardance, together with good notched Izod impact strength at ambient temperature; good notched Izod impact strength at low temperature; and/or good heat deflection temperature. In addition, these amounts provide compositions that meet UL94 5VB, V0/V1 test requirements and that meet other criteria such as minimum time to drip, as described herein. Relative amounts of each component and their respective composition may be determined by methods known to those of ordinary skill in the art.

Flammablity Tests

In one embodiment, the thermoplastic compositions are of particular utility in the manufacture flame retardant articles that pass the UL94 vertical burn tests. In the UL94 vertical burn test, a flame is applied to a vertically fastened test specimen placed above a cotton wool pad. Flammability tests were performed following the procedure of Underwriter's Laboratory Bulletin 94 entitled "Tests for Flammability of Plastic Materials, UL94." According to this procedure, materials may be classified as HB, V0, UL94 V1, V2, 5VA and/or 5VB on the basis of the test results obtained for five samples as per the following related criteria (Table 3).

TABLE 3

Flammability test results criteria conditions:

| Criteria Conditions | V-0 | V-1 | V-2 |
|---|---|---|---|
| Afterflame time for each individual specimen t1 or t2 | ≤10 s | ≤30 s | ≤30 s |
| Total afterflame time for any condition set (t1 plus t2 for the 5 specimens) | ≤50 s | ≤250 s | ≤250 s |
| Afterflame plus afterglow time for each individual specimen after the second flame application (t2 + t3) | ≤30 s | ≤60 s | ≤60 s |
| Afterflame or afterglow of any specimen up to the holding clamp | No | No | No |
| Cotton indicator ignited by flaming particles or drops | No | No | Yes |

TABLE 4

Flammability Test results for Polycarbonate Homopolymer and Polycarbonate with Polycarbonate-Polysiloxane blends Specimens nominal thickness 4 mm Standard UL94

| Blend | Av (t1 + t2) s | Remarks-1 | Av (t2 + t3) s | Remarks-2 | Type |
|---|---|---|---|---|---|
| Blend 1 | 7 | Sample didn't drip | 9.3 | Sample didn't drip | V0 |
| Blend 2 | 28.6 | Sample didn't drip | 49.3 | Sample didn't drip | V1 |
| Blend 3 | 16.3 | Sample didn't drip | 27.3 | Sample didn't drip | V1 |
| Polycarbonate Homopolymer | 16 | Sample didn't drip | 21.3 | Sample dripped particles, that ignite cotton | V2 |

As shown in Table 4 above, the blend compositions (Blend 1, 2 and 3) prepared using the polycarbonate-ester-functional polysiloxane copolymers (Copolymers I, II, III) respectively are generally having better flame resistance than Polycarbonate Homopolymer. Considering the average flame out time after the lightings, the blend composition (blend 1) with the instant polycarbonate-ester functional polysiloxane copolymer (Copolymer I) showed extremely improved flame resistance. Moreover, none of the instant copolymers incorporated blend compositions show dripped particles and cotton ignition.

Tensile Tests

Tensile tests of dumb-bell shaped specimens were carried out using an Instron tensile tester using a 5 KN load cell. The gauge length of the dog-bone specimens was 0.97 inch and the cross-head speed was 0.2 inch/min. The data were analyzed using Bluehill Lite software. Table 5 describes the results obtained from the tensile tests.

TABLE 5

Tensile Test of Blends

| Blend Type | Young's Modulus (psi) | Tensile Stress at Yield (psi) | Tensile Strain at Break (%) |
|---|---|---|---|
| Blend 1 | 136,032 ± 11,909 | 10,078 ± 1,159 | 167 ± 10.8 |
| Polycarbonate Homopolymer | 129,977 ± 9,215 | 9,539 ± 1,493 | 175 ± 7 |

Typically, the tensile strength measurements depicts that the incorporation of instant polycarbonate-polysiloxane copolymers of invention into the polycarbonate homopolymer (Blend 1) are maintaining the polycarbonate material property without any decrement in material property in spite of improving the other properties while addition.

Low Temperature Impact Strength Tests:

In another embodiment the instant specimens were evaluated using notched izod tests. The test procedure was based on the ISO 180/1A method. The results of the test were reported in terms of energy absorbed per unit of specimen width, and expressed in Izod Notch Energies (KJ/m2) and are shown in Table 6. Typically the final test result is calculated as the average of test results of five test bars.

TABLE 6

Izod Test of Blends

| Blend Type | Izod test at 23° C. | Izod test at 0° C. | Izod test at −20° C. | Izod test at −40° C. | Izod test at −60° C. |
|---|---|---|---|---|---|
| Blend 1 | 72.21 | 27.81 | 23.1 | 17.7 | 13.2 |
| Standard Deviation | 11.88 | 0.32 | 1.69 | 1.67 | 0.91 |
| Polycarbonate Homopolymer | 68.08 | 18.07 | 16.18 | 12.87 | 9.93 |
| Standard Deviation | 3.99 | 1.24 | 0.86 | 0.62 | 1.39 |

As the Izod test temperature is lowered below room temperature, the energy absorbed by instant polycarbonate-polysiloxane copolymers incorporated blends is significantly higher than the polycarbonate homopolymer.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. A method of preparing the polyorganosiloxane having the structure of Formula I:

(Formula I)

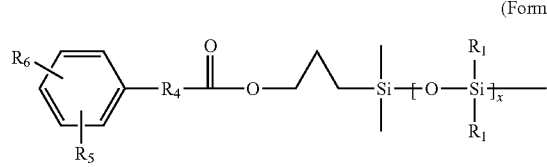

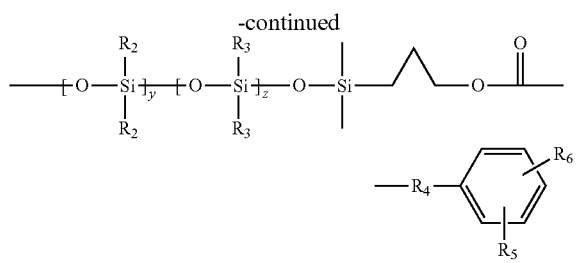

wherein $R_1$, $R_2$, and $R_3$ are independently a hydrocarbon radical, an unsaturated radical, an alkoxy radical, an aryl radical or an alkenyloxy radical; $R_4$ is independently a direct bond or hydrocarbon radical optionally substituted with oxygen and nitrogen; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group; $R_6$ is independently a hydroxyl group; x is from 1 to 300; y is from 0 to 50; and z is from 0 to 50 comprising:

reacting a hydride terminated siloxane represented by Formula II:

(Formula II)

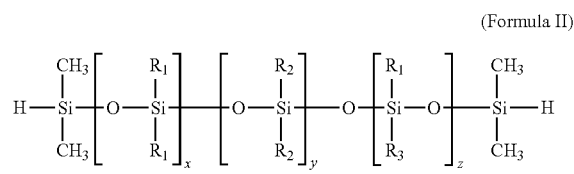

wherein $R_1$, $R_2$ and $R_3$, are independently a hydrocarbon radical, an unsaturated radical, an alkoxy radical, an aryl radical or an alkenyloxy radical; x is from 1 to 300; y is from 0 to 50; and z is from 0 to 50;

with a phenol protected compound having the general formula:

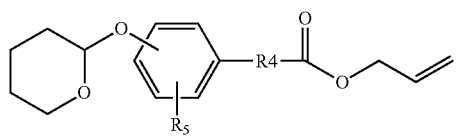

wherein $R_4$ is independently a direct bond or hydrocarbon radical optionally substituted with oxygen and nitrogen; $R_5$ is independently a hydrogen, a halogen, an aliphatic group having from 1 to 6 carbon atoms, an aromatic group having 6 to 8 carbon atoms, an alkoxy group having from 1 to 6 carbon atoms, or an aryloxy group, at a temperature effective to produce a phenol-protected siloxane;

deprotecting the phenol-protected siloxane compound in a mixture of a polar solvent and a mineral acid to form a phenol-deprotected siloxane; and purifying the phenol-deprotected siloxane.

2. The method of claim 1, wherein the hydride terminated siloxane with the phenol protected compound is carried out at a temperature of about 80° C. to 200° C.

3. The method of claim 1, wherein the phenol protected compound is allyl 4-((tetrahydro-2H-pyran-2-yl)oxy)benzoate or allyl 2-(4-((tetrahydro-2H-pyran-2-yl)phenyl acetate.

4. The method of claim 1, wherein the mixture of polar solvent and mineral acid is tetrahydrofuran and hydrogen chloride.

5. The method of claim 1, wherein the purifying phenol-deprotected siloxane is achieved by removal of organics.

6. The method of claim 5, wherein the removal of organics is achieved at reduced pressure and at a temperature of about 150° C. to 300° C.

* * * * *